(12) United States Patent
Verslegers et al.

(10) Patent No.: US 10,168,481 B2
(45) Date of Patent: *Jan. 1, 2019

(54) METHOD AND SYSTEM FOR GRATING COUPLERS INCORPORATING PERTURBED WAVEGUIDES

(71) Applicant: Luxtera, Inc., Carlsbad, CA (US)

(72) Inventors: Lieven Verslegers, La Jolla, CA (US); Attila Mekis, Carlsbad, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,897

(22) Filed: Apr. 11, 2018

(65) Prior Publication Data

US 2018/0292609 A1    Oct. 11, 2018

Related U.S. Application Data

(63) Continuation of application No. 15/433,668, filed on Feb. 15, 2017, now Pat. No. 9,946,024, which is a
(Continued)

(51) Int. Cl.
*G02B 6/34* (2006.01)
*G02B 6/26* (2006.01)
(Continued)

(52) U.S. Cl.
CPC ............. *G02B 6/26* (2013.01); *G02B 5/1861* (2013.01); *G02B 6/124* (2013.01); *G02B 6/30* (2013.01);
(Continued)

(58) Field of Classification Search
CPC . G02B 6/26; G02B 6/34; G02B 6/124; G02B 2006/12107; G02B 6/30; G02B 5/1861
(Continued)

(56) References Cited

U.S. PATENT DOCUMENTS

| 7,136,544 | B1 | 11/2006 | Gunn |
| 2004/0208447 | A1 | 10/2004 | Ramadan |
| 2010/0006784 | A1 | 1/2010 | Mack |

OTHER PUBLICATIONS

European Patent Office, Communication with extended European Search Report, in Application No. 13175823.8, dated Oct. 28, 2013.
(Continued)

*Primary Examiner* — Robert Tavlykaev
(74) *Attorney, Agent, or Firm* — McAndrews, Held & Mallay, Ltd.

(57) ABSTRACT

Methods and systems for grating couplers incorporating perturbed waveguides are disclosed and may include in a semiconductor photonics die, communicating optical signals into and/or out of the die utilizing a grating coupler on the die, where the grating coupler comprises perturbed waveguides. The perturbed waveguides may include rows of continuous waveguides with scatterers extending throughout a length of said perturbed waveguides a variable width along their length. The grating coupler may comprise a single polarization grating coupler comprising perturbed waveguides and a non-perturbed grating. The grating coupler may comprise a polarization splitting grating coupler (PSGC) that includes two sets of perturbed waveguides at a non-zero angle, or a plurality of non-linear rows of discrete shapes. The PSGC may comprise discrete scatterers at an intersection of the sets of perturbed waveguides. The grating coupler may comprise individual scatterers between the perturbed waveguides.

20 Claims, 22 Drawing Sheets

Related U.S. Application Data continuation of application No. 15/232,051, filed on Aug. 9, 2016, now Pat. No. 9,575,253, which is a continuation of application No. 14/811,199, filed on Jul. 28, 2015, now Pat. No. 9,417,410, which is a continuation of application No. 13/936,408, filed on Jul. 8, 2013, now Pat. No. 9,091,827.

(60) Provisional application No. 61/690,952, filed on Jul. 9, 2012.

(51) Int. Cl.
    *G02B 6/124* (2006.01)
    *G02B 6/30* (2006.01)
    *G02B 5/18* (2006.01)
    *G02B 6/12* (2006.01)

(52) U.S. Cl.
    CPC ...... *G02B 6/34* (2013.01); *G02B 2006/12107* (2013.01)

(58) Field of Classification Search
    USPC .......................................................... 385/37
    See application file for complete search history.

(56) References Cited

OTHER PUBLICATIONS

European Patent Office, Communication with Euroopean Search Report, in Application No. 18157074.8, dated Jun. 25, 2018.

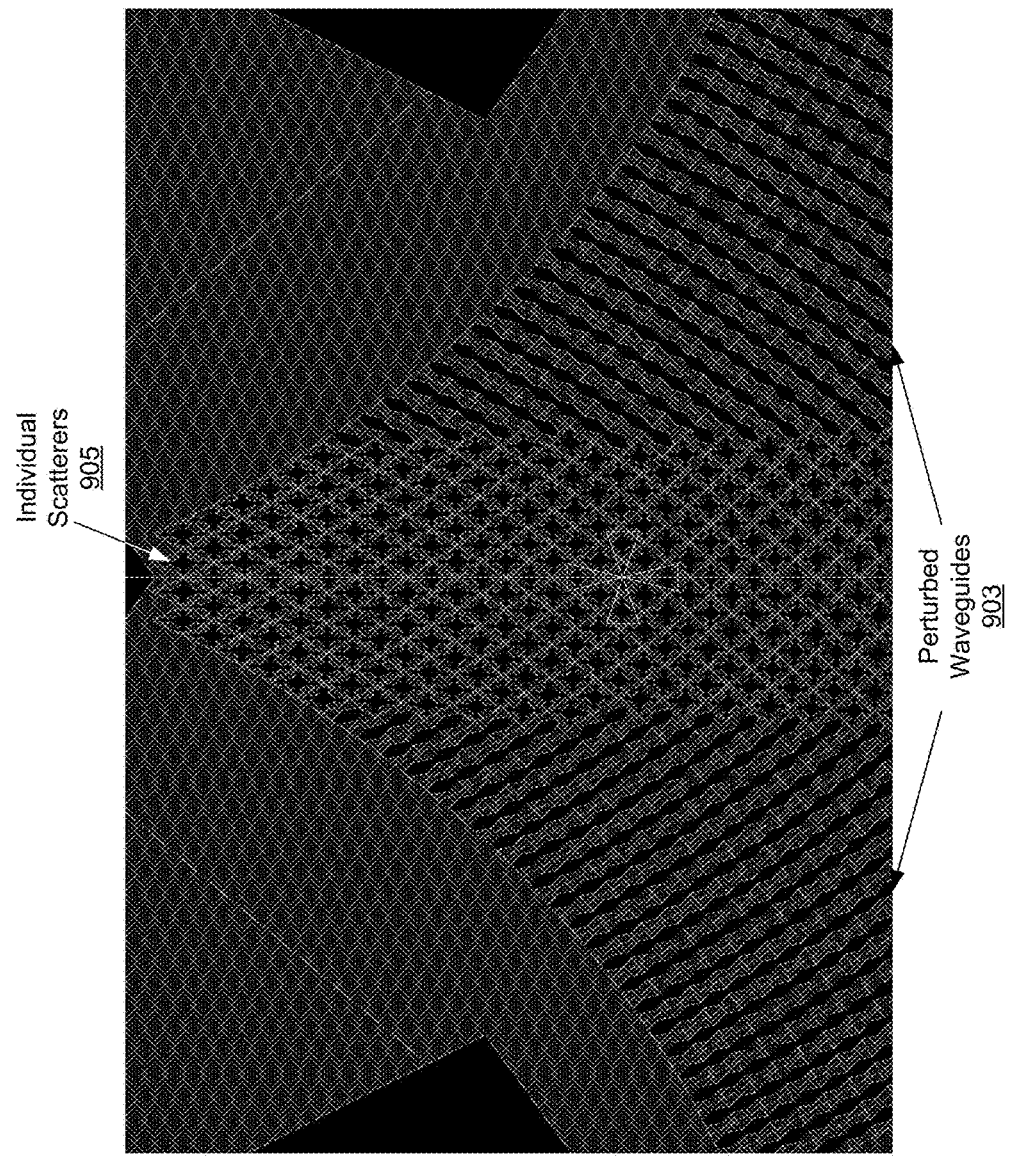

METHOD AND SYSTEM FOR GRATING COUPLERS INCORPORATING PERTURBED WAVEGUIDES

CROSS-REFERENCE TO RELATED APPLICATIONS/INCORPORATION BY REFERENCE

This application is a continuation of application Ser. No. 15/433,668 filed on Feb. 15, 2017, which is a continuation of application Ser. No. 15/232,051 filed on Aug. 9, 2016 now U.S. Pat. No. 9,575,253, which is a continuation of application Ser. No. 14/811,199 filed on Jul. 28, 2015 now U.S. Pat. No. 9,417,410, which is a continuation of application Ser. No. 13/936,408 filed on Jul. 8, 2013 now U.S. Pat. No. 9,091,827, which makes reference to, claims priority to and claims the benefit of U.S. Provisional Patent Application No. 61/690,952 filed on Jul. 9, 2012. Each of the above stated applications is hereby incorporated herein by reference in its entirety.

FIELD OF THE INVENTION

Certain embodiments of the invention relate to semiconductor processing. More specifically, certain embodiments of the invention relate to a method and system for grating couplers incorporating perturbed waveguides.

BACKGROUND OF THE INVENTION

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a photonic interposer, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 9B is an image of a mask design with individual scatterers at the intersection of perturbed waveguides in a polarization splitting grating coupler, in accordance with an exemplary embodiment of the invention.

DETAILED DESCRIPTION OF THE INVENTION

Certain aspects of the invention may be found in a method and system for grating couplers incorporating perturbed waveguides. Exemplary aspects of the invention may comprise in a semiconductor photonics die, communicating optical signals into and/or out of the semiconductor die utilizing a grating coupler on the semiconductor photonics die, where the grating coupler comprises perturbed waveguides. The perturbed waveguides may comprise a variable width along a length of the perturbed waveguides. The grating coupler may comprise a single polarization grating coupler comprising perturbed waveguides and a non-perturbed grating. The grating coupler may comprise a polarization splitting grating coupler that includes two sets of perturbed waveguides at a non-zero angle from each other. The polarization splitting grating coupler may comprise discrete scatterers at an intersection of the sets of perturbed waveguides. The polarization splitting grating coupler may comprise a plurality of non-linear rows of discrete shapes. The grating couplers may be etched in a silicon layer on the semiconductor photonics die or deposited on the semiconductor photonics die. The grating coupler may comprise individual scatterers between the perturbed waveguides.

Figure 1A:
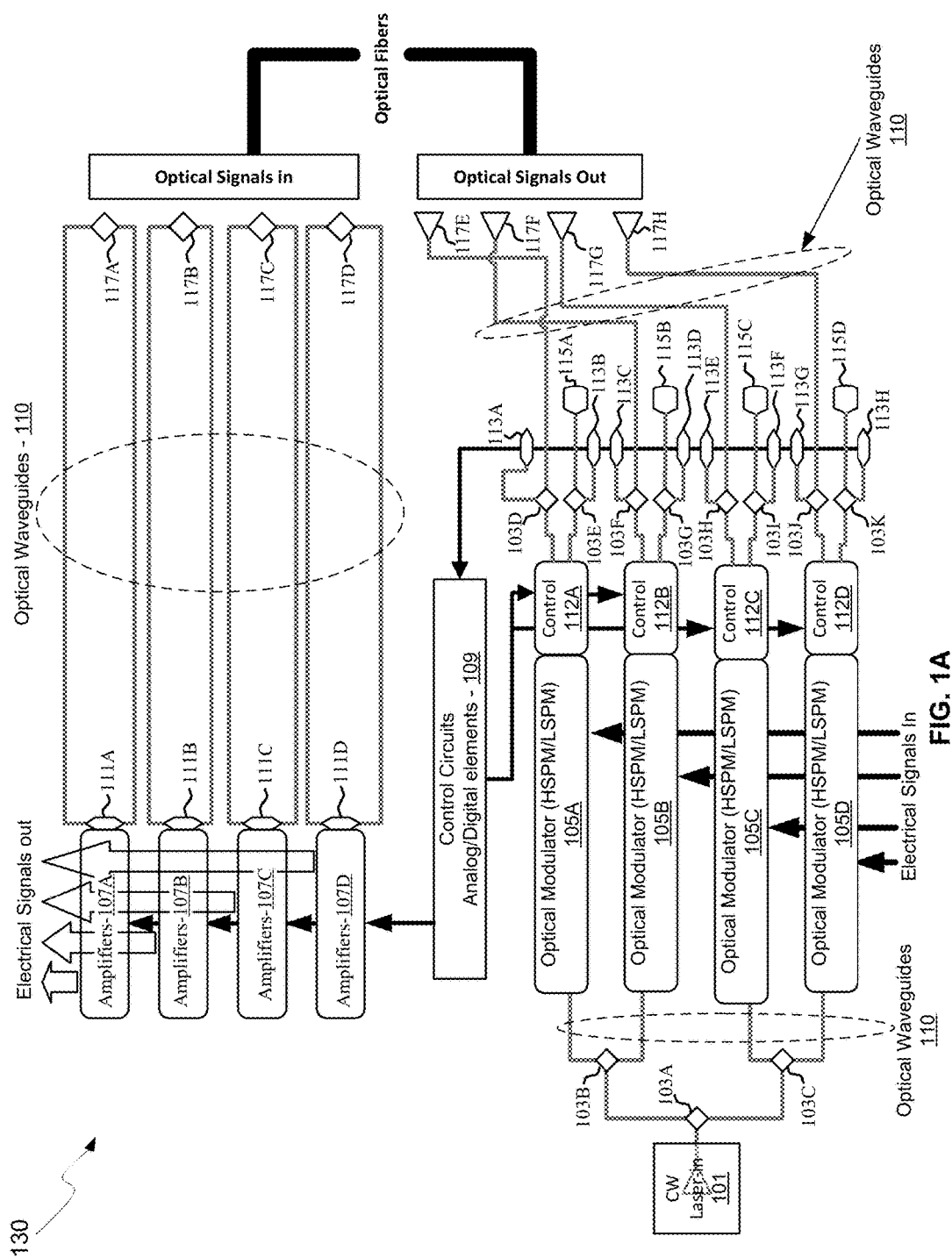
FIG. 1A is a block diagram of a photonically enabled CMOS chip comprising grating couplers with perturbed waveguides, in accordance with an exemplary embodiment of the invention.

FIG. 1A is a block diagram of a photonically enabled CMOS chip comprising grating couplers with perturbed waveguides, in accordance with an exemplary embodiment of the invention. Referring to FIG. 1A, there is shown optoelectronic devices on a CMOS chip 130 comprising optical modulators 105A-105D, photodiodes 111A-111D, monitor photodiodes 113A-113H, and optical devices comprising taps 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

Optical signals are communicated between optical and optoelectronic devices via optical waveguides 110 fabricated in the CMOS chip 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab.

The optical modulators 105A-105D comprise Mach-Zehnder or ring modulators, for example, and enable the modulation of the continuous-wave (CW) laser input signal. The optical modulators 105A-105D comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

The phase modulators may have a dual role: to compensate for the passive biasing of the MZI and to apply the additional phase modulation used to modulate the light intensity at the output port of the MZI according to a data stream. The former phase tuning and the latter phase modulation may be applied by separate, specialized devices, since the former is a low speed, slowly varying contribution, while the latter is typically a high speed signal. These devices are then respectively referred to as the LSPM and the HSPM. Examples for LSPM are thermal phase modulators (TPM), where a waveguide portion is locally heated up to modify the index of refraction of its constituting materials, or forward biased PIN junction phase modulators (PINPM) where current injection into the PIN junction modifies the carrier density, and thus the index of refraction of the semiconductor material. An example of an HSPM is a reversed biased PIN junction, where the index of refraction is also modulated via the carrier density, but which allows much faster operation, albeit at a lower phase modulation efficiency per waveguide length.

The outputs of the modulators 105A-105D may be optically coupled via the waveguides 110 to the grating couplers 117E-117H. The taps 103D-103K comprise four-port optical couplers, for example, and are utilized to sample the optical signals generated by the optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D may be utilized to couple light received from optical fibers into the CMOS chip 130, and the grating couplers 117E-117H may be utilized to couple light from the CMOS chip 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

In an example scenario, the grating couplers 117A-117H may comprise perturbed waveguides, such that at least one parameter of the structure is altered along the length of the waveguides. For example, for a grating coupler that comprises an array of waveguides, either straight or curved, the width and/or thickness may vary across the length, either in a periodic or aperiodic fashion. An aperiodic variation may be useful where more scattering is required in one section of the waveguides as opposed to another, such as in a single polarization grating coupler, where too much scattering at the front section causes the optical mode to have less overlap with an optical fiber centered on the coupler.

Perturbed waveguides may improve coupling efficiency by enabling the configuring of the optical mode to approximately match that of the optical fiber, i.e., an optical mode from the optical fiber is very similar to the scattered mode in the grating couplers 117A-117H. Similarly, an optical signal may be transmitted out of the CMOS chip 130 by the grating couplers 117A-117H such that the optical mode transmitted is centered on the optical fiber.

The optical fibers may be epoxied, for example, to the CMOS chip, and may be aligned at an angle from normal to the surface of the CMOS chip 130 to optimize coupling efficiency. In an embodiment of the invention, the optical fibers may comprise single-mode fiber (SMF) and/or polarization-maintaining fiber (PMF).

In another exemplary embodiment, optical signals may be communicated directly into the surface of the CMOS chip 130 without optical fibers by directing a light source on an optical coupling device in the chip, such as the light source interface 135 and/or the optical fiber interface 139. This may be accomplished with directed laser sources and/or optical sources on another chip flip-chip bonded to the CMOS chip 130.

The photodiodes 111A-111D may convert optical signals received from the grating couplers 117A-117D into electrical signals that are communicated to the amplifiers 107A-107D for processing. In another embodiment of the invention, the photodiodes 111A-111D may comprise high-speed heterojunction phototransistors, for example, and may comprise germanium (Ge) in the collector and base regions for absorption in the 1.3-1.6 µm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the CMOS chip 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an embodiment of the invention, the control sections 112A-112D may include sink and/or source driver electronics that may enable a bidirectional link utilizing a single laser.

In operation, the CMOS chip 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the CMOS chip 130.

Integrated photonics platforms allow the full functionality of an optical transceiver to be integrated on a single chip, the CMOS chip 130, for example. A transceiver chip comprises optoelectronic circuits that create and process the optical/electrical signals on the transmitter (Tx) and the receiver (Rx) sides, as well as optical interfaces that couple the optical signal to and from one or more fibers. The signal processing functionality may comprise modulating the optical carrier, detecting the optical signal, splitting or combining data streams, and multiplexing or demultiplexing data on carriers with different wavelengths.

The light source may be external to the chip or may be integrated with the chip in a hybrid scheme. It is often advantageous to have an external continuous-wave (CW) light source, because this architecture allows heat sinking and temperature control of the source separately from the transceiver chip 130. An external light source may also be connected to the transceiver chip 130 via a fiber interface.

An integrated transceiver may comprise at least three optical interfaces, including a transmitter input port to interface to the CW light source, labeled as CW Laser In 101; a transmitter output port to interface to the fiber carrying the optical signal, labeled Optical Signals Out; and a receiver input port to interface to the fiber carrying the optical signal, labeled Optical Signals In. Each of the interfaces may comprise grating couplers with perturbed waveguides for reduced optical losses due to reduced mode-mismatch between the fibers and the grating couplers.

Figure 1B:
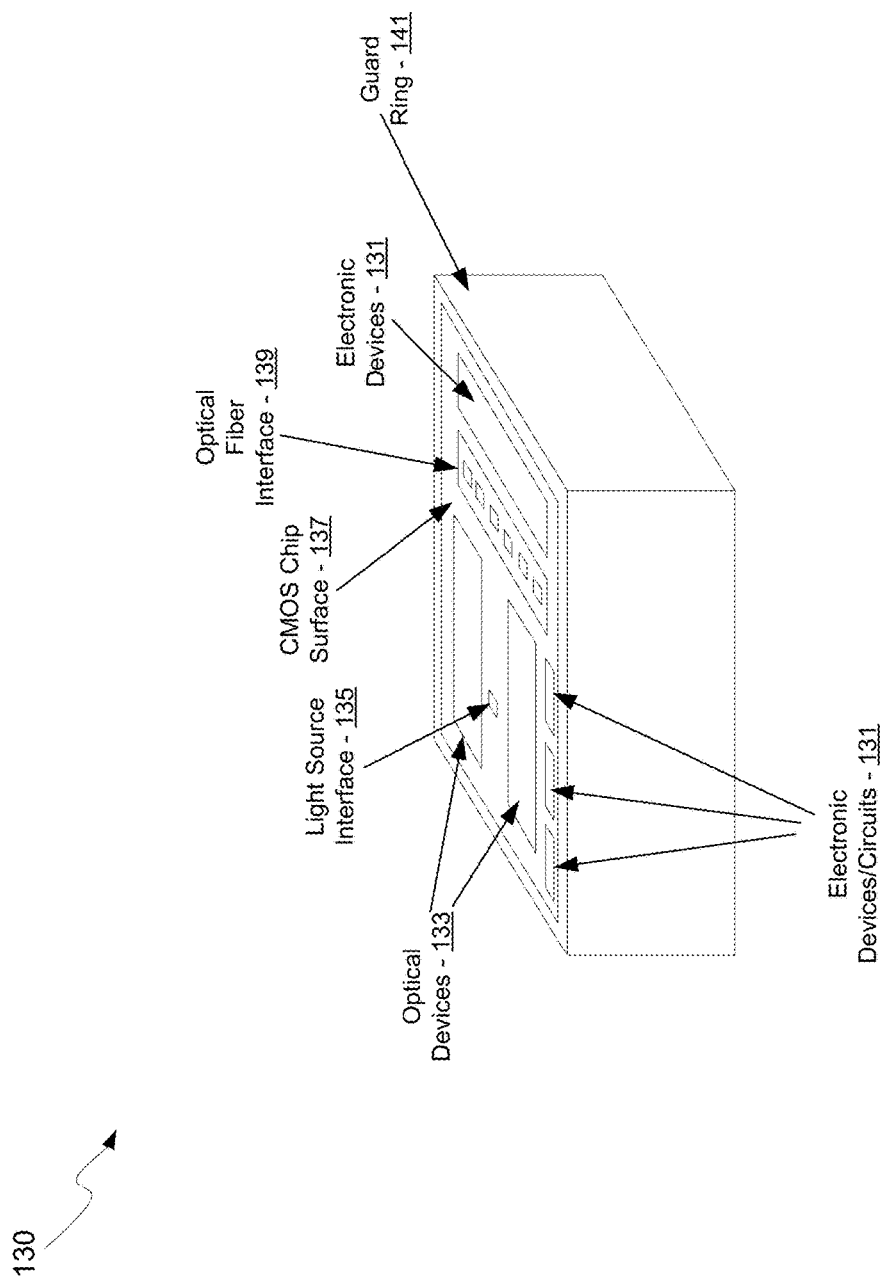
FIG. 1B is a diagram illustrating a CMOS chip, in accordance with an exemplary embodiment of the invention.

FIG. 1B is a diagram illustrating an exemplary CMOS chip, in accordance with an exemplary embodiment of the invention. Referring to FIG. 1B, there is shown the CMOS chip 130 comprising electronic devices/circuits 131, optical and optoelectronic devices 133, a light source interface 135, CMOS chip front surface 137, an optical fiber interface 139, and CMOS guard ring 141.

The light source interface 135 and the optical fiber interface 139 comprise grating couplers, for example, that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge. The grating couplers may comprise perturbed waveguides for reduced optical mode mismatch between the grating coupler and an optical source, such as an optical fiber.

The electronic devices/circuits 131 comprise circuitry such as the amplifiers 107A-107D and the analog and digital control circuits 109 described with respect to FIG. 1A, for example. The optical and optoelectronic devices 133 comprise devices such as the taps 103A-103K, optical terminations 115A-115D, grating couplers 117A-117H, optical modulators 105A-105D, high-speed heterojunction photodiodes 111A-111D, and monitor photodiodes 113A-113H.

Figure 1C:
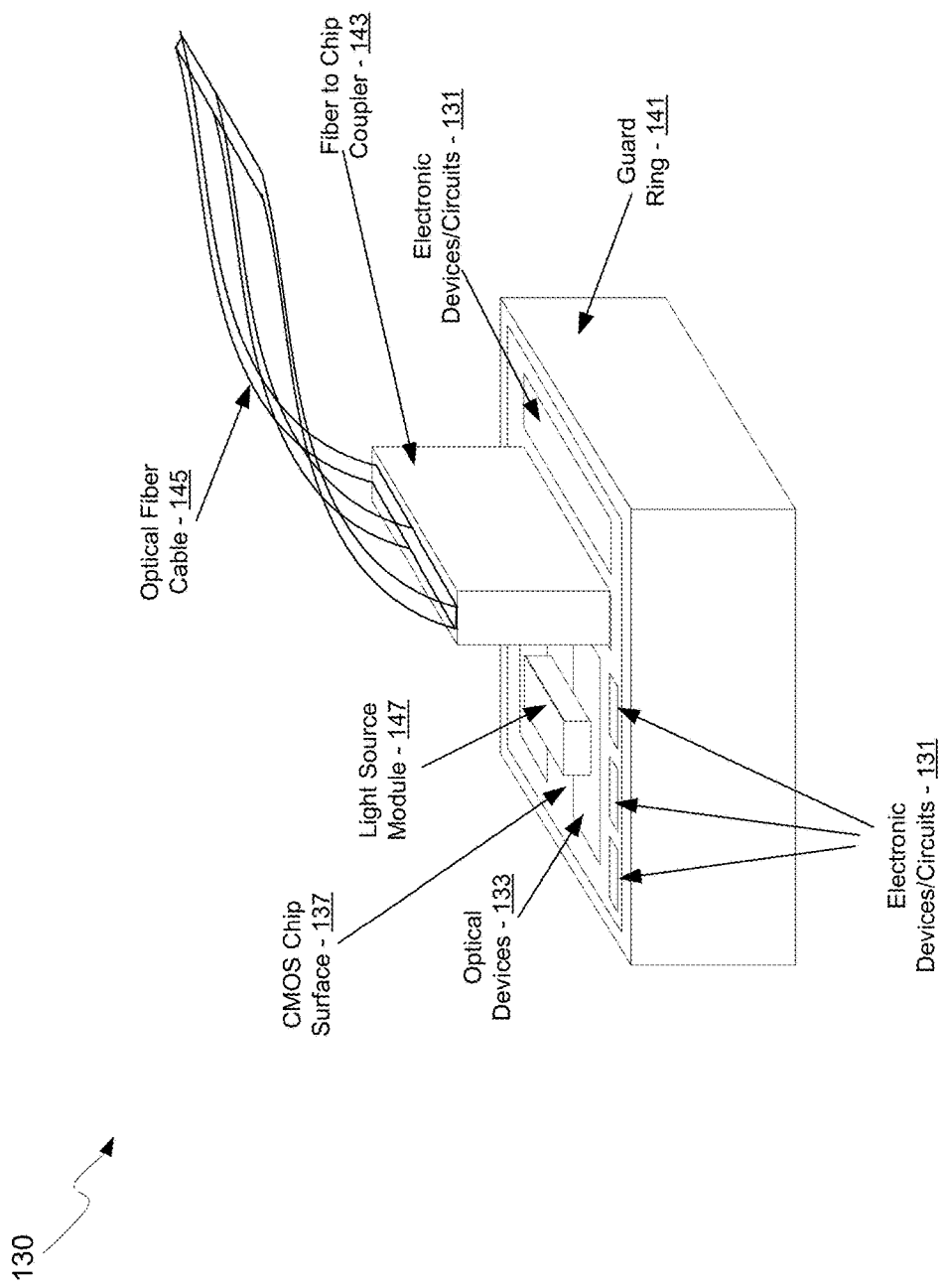
FIG. 1C is a diagram illustrating a CMOS chip coupled to an optical fiber cable, in accordance with an exemplary embodiment of the invention.

FIG. 1C is a diagram illustrating a CMOS chip coupled to an optical fiber cable, in accordance with an exemplary embodiment of the invention. Referring to FIG. 1C, there is shown the CMOS chip 130 comprising the CMOS chip surface 137, and the CMOS guard ring 141. There is also shown a fiber-to-chip coupler 143, an optical fiber cable 145, and an optical source assembly 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an embodiment of the invention, the optical fiber cable may be affixed, via epoxy for example, to the CMOS chip surface 137. The fiber chip coupler 143 enables the physical coupling of the optical fiber cable 145 to the CMOS chip 130.

In an embodiment of the invention, the light source interface 135 and the optical fiber interface 139 comprise grating couplers shown in FIG. 1B may comprise perturbed waveguides for reduced optical mode mismatch between the grating couplers and the optical fiber cable 145 and the light source module 147.

Figure 2:
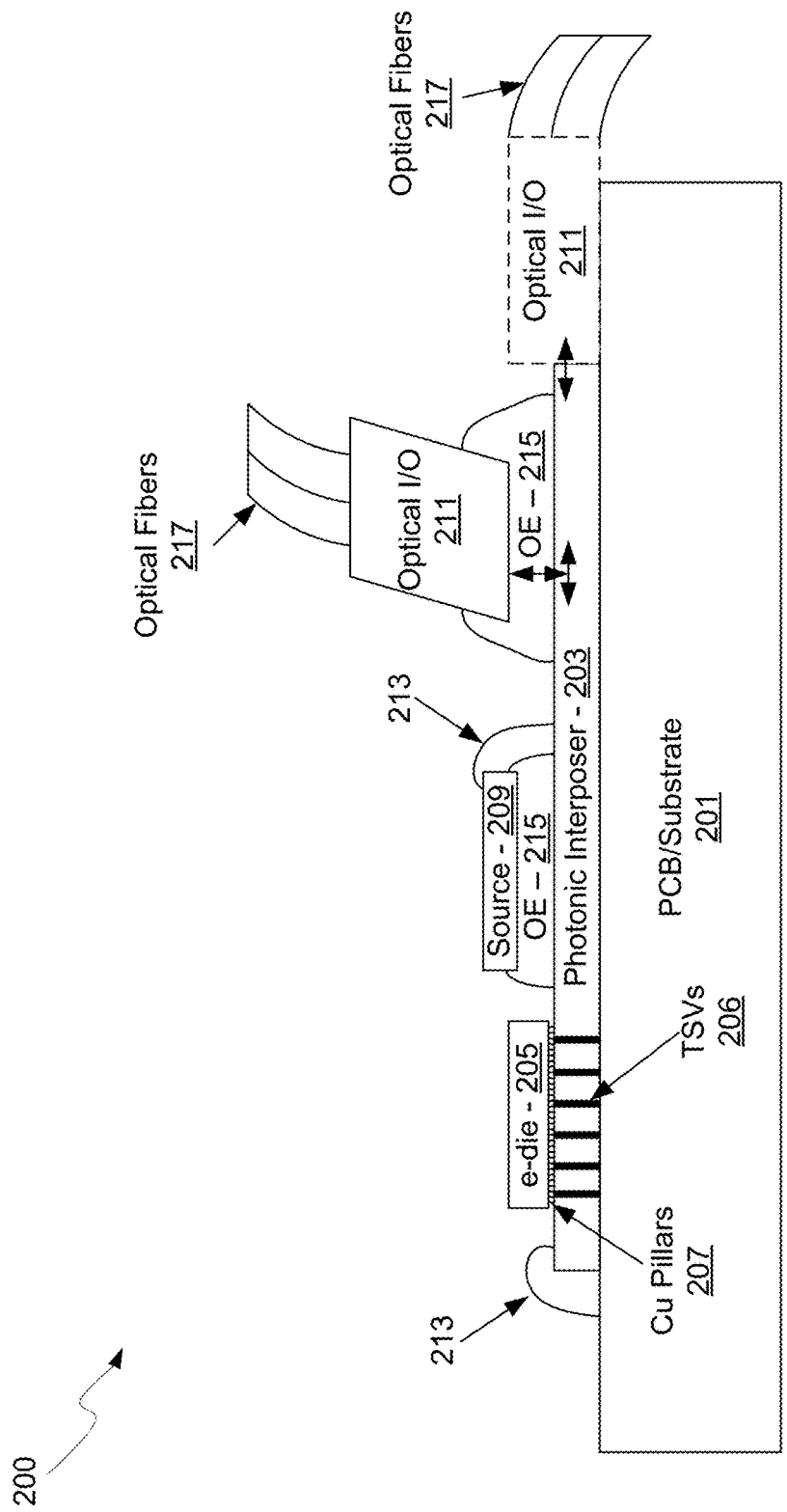
FIG. 2 is a schematic illustrating an optical transceiver including a photonic interposer comprising grating couplers with perturbed waveguides, in accordance with an exemplary embodiment of the invention.

FIG. 2 is a schematic illustrating an optical transceiver including a photonic interposer comprising grating couplers with perturbed waveguides, in accordance with an exemplary embodiment of the invention. Referring to FIG. 2, there is shown a photonic transceiver 200 comprising a printed circuit board (PCB)/substrate 201, a silicon photonic interposer 203, an electronic CMOS die 205, through silicon vias (TSVs) 206, copper pillars 207, an optical source module 209, an optical input/output (I/O) 211, wire bonds 213, optical epoxy 215, and optical fibers 217.

The PCB/substrate 201 may comprise a support structure for the photonic transceiver 200, and may comprise both insulating and conductive material for isolating devices as well as providing electrical contact for active devices on the silicon photonic interposer 203 as well as to devices on the electronics die 205 via the silicon photonic interposer 203. In addition, the PCB/substrate may provide a thermally conductive path to carry away heat generated by devices and circuits in the electronics die 205 and the optical source module 209.

The silicon photonic interposer 203 may comprise a CMOS chip with active and passive optical devices such as waveguides, modulators, photodetectors, grating couplers, taps, and combiners, for example. The functionalities supported by the silicon photonic interposer 203 may comprise photo-detection, optical modulation, optical routing, and optical interfaces for high-speed I/O and optical power delivery.

The silicon photonic interposer 203 may also comprise copper pillars 207 for coupling the electronics die 205 to the silicon photonic interposer 203, as well as grating couplers for coupling light into the die from the optical source module 209 and into/out of the die via the optical I/O 211. In addition, the silicon photonic interposer 203 may comprise TSVs 206 for electrical interconnection through the die, such as between the PCB/substrate 201 and the electronics die 205. Optical interfaces may also be facilitated by the optical epoxy 215, providing both optical transparency and mechanical fixation.

The electronics die 205 may comprise one or more electronic CMOS chips that provide the required electronic functions of the photonic transceiver 200. The electronics die 205 may comprise a single chip or a plurality of die coupled to the silicon photonic interposer 203 via the copper pillars 207. The electronics die 205 may comprise TIA's, LNAs, and control circuits for processing optical signals in the photonics chip 203. For example, the electronics die 205 may comprise driver circuitry for controlling optical modulators in the silicon photonic interposer 203 and variable gain amplifiers for amplifying electrical signals received from photodetectors in the silicon photonic interposer 203. By incorporating photonics devices in the silicon photonic interposer 203 and electronic devices in the electronics die 205, the CMOS processes for each chip may be optimized for the type of devices incorporated.

The TSVs 206 may comprise electrically conductive paths that extend vertically through the silicon photonic interposer 203 and provide electrical connectivity between the electronics die 205 and the PCB/substrate 201. This may be utilized in place of wire bonds, such as the wire bonds 213, or in conjunction with wire bonds.

The copper pillars 207 may comprise linear or 2D arrays of metal pillars to provide electrical contact between the silicon photonic interposer 203 and the electronics die 205. For example, the copper pillars 207 may provide electrical contact between photodetectors in the silicon photonic interposer 203 and associated receiver circuitry in the electronics die 205. In addition, the copper pillars 207 may provide mechanical coupling of the electronics and photonics die, and may be encapsulated with underfill to protect the metal and other surfaces.

The optical source module 209 may comprise an assembly with an optical source, such as a semiconductor laser, and associated optical and electrical elements to direct one or more optical signals into the silicon photonic interposer 203. An example of the optical source module is described in U.S. patent application Ser. No. 12/500,465 filed on Jul. 9, 2009, which is hereby incorporated herein by reference in its entirety. In another exemplary scenario, the optical signal or signals from the optical source assembly 209 may be coupled into the silicon photonic interposer 203 via optical fibers affixed above grating couplers in the silicon photonic interposer 203.

The optical I/O 211 may comprise an assembly for coupling the optical fibers 217 to the silicon photonic interposer 203. Accordingly, the optical I/O 211 may comprise mechanical support for one or more optical fibers and an optical source to be coupled to the silicon photonic interposer 203, such as by the optical epoxy 215. In another exemplary scenario, the optical I/O 211 may also be affixed along an edge of the silicon photonic interposer 203, as shown by the dashed line optical I/O 211, enabling the coupling of optical signals directly into optical waveguides as opposed to grating couplers on the surface of the silicon photonic interposer 203.

In operation, continuous-wave (CW) optical signals may be communicated into the silicon photonic interposer 203 from the optical source module 209 via one or more grating couplers in the silicon photonic interposer 203. The grating couplers may comprise perturbed waveguides for reduced optical mode mismatch between signals received from the optical fibers 217 and the optical scattering mode of the grating couplers. Photonic devices in the silicon photonic interposer 203 may then process the received optical signals. For example, one or more optical modulators may modulate the CW signal based on electrical signals received from the electronics die 205. Electrical signals may be received from the electronics die 205 via the Cu pillars 207. By integrating modulators in the silicon photonic interposer 203 directly beneath the source of the electrical signals in the electronics die 205, signal path lengths may be minimized, resulting in very high speed performance. For example, utilizing ~20 micron Cu pillars with <20 fF capacitance, speeds of 50 GHz and higher can be achieved.

The modulated optical signals may then be communicated out of the silicon photonic interposer 203 via grating couplers situated beneath the optical I/O 211. The grating couplers for transmitting optical signals out of the silicon photonic interposer 203 may also comprise perturbed waveguides for reduced optical mode mismatch. In this manner, high-speed electrical signals generated in the electronics die 205 may be utilized to modulate a CW optical signal and subsequently communicated out of the silicon photonic interposer 203 via the optical fibers 217.

Similarly, modulated optical signals may be received in the silicon photonic interposer 203 via the optical fibers 217 and the optical I/O 211. The received optical signals may be communicated within the silicon photonic interposer 203 via optical waveguides to one or more photodetectors integrated in the silicon photonic interposer 203. The photodetectors may be integrated in the silicon photonic interposer 203 such that they lie directly beneath the associated receiver electronics circuitry in the electronics die 205 when bonded and electrically coupled by the low parasitic capacitance Cu pillars 207.

The hybrid integration of CMOS electronics die on silicon photonic interposer via Cu pillars enables very high speed optical transceivers utilizing CMOS processes. In addition, integrating separate photonic and electronic die enables the independent optimization of the performance of electronic and photonic functions within the respective CMOS processes. The electronic die, which is mounted by face-to-face bonding to the silicon photonic interposer, may contain electrical circuits that "drive" the photonic circuits on the interposer. Those circuits replace the electronic signaling drive circuits from conventional electrical interconnect solutions.

In addition, optical interconnect between multiple electronic die, i.e. chip-to-chip interconnect, is enabled by the silicon photonic interposer 203, where transceiver functions are supported by the combined electronic die and interposer and the associated optical routing on the silicon photonic interposer die 203. The invention is not limited to the arrangement shown in FIG. 2. Accordingly, various stacking arrangements are possible. For example, photonic interposers may be sandwiched between electronic chips and stacks of interposers/electronic chips may be configured resulting in a 3-dimensional structure.

Figure 3:
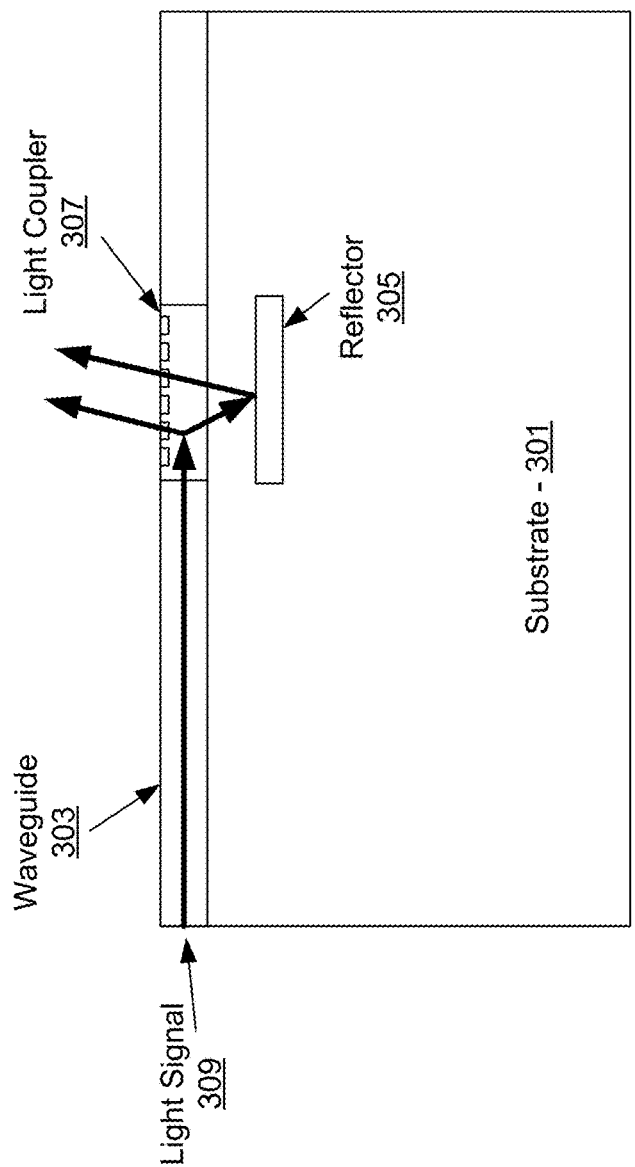
FIG. 3 is a drawing illustrating a chip with a grating coupler, in accordance with an exemplary embodiment of the invention.

FIG. 3 is a drawing illustrating a chip with a grating coupler, in accordance with an exemplary embodiment of the invention. Referring to FIG. 3, there is shown a substrate 301, a waveguide 303, a reflector 305, a light coupler 307, and a light signal 309. The substrate 301 may comprise a silicon chip, for example, that may comprise photonic and electronic devices. In an example scenario, the substrate 301 comprises a silicon-on-insulator (SOI) wafer with an oxide layer buried beneath a silicon layer, the latter of which may be utilized for the photonic and electronic devices. For example, the waveguide 303 and the light coupler 307 may be formed in the silicon layer.

The waveguide 303 may comprise a thin strip of silicon, for example, that may communicate optical signals between optoelectronic and photonic devices integrated in the top surface of the substrate 301. For example, the waveguide 303 may communicate an optical signal from other photonic devices in the substrate 301 to the light coupler 307.

In integrated optical circuits, surface-emitting light couplers are often preferable over edge-coupling solutions. Edge-coupling light from an optical fiber to a planar waveguide circuit typically requires complex, three-dimensional integrated mode converters; polished chip end facets; accurate positioning of the polished facet with respect to the end of the mode converter; specialty lensed fibers; and submicron alignment to the chip. Surface-emitting couplers allow flexibility in the location of the optical interface anywhere on the chip surface, not only near the chip edges. In addition, it has been demonstrated that these couplers can couple light to fibers in a near-normal orientation very efficiently. One example of such couplers is grating couplers. The light coupler 307 may comprise a grating coupler with perturbed waveguides. A conventional single polarization grating coupler may comprise an array of regularly spaced and constant width/thickness waveguides/trenches. Waveguides with perturbations in the width of and/or thickness of and/or spacing may provide enhanced scattering structure from a regular array of waveguides.

The main loss mechanisms in surface-emitting couplers are 1) losses to the substrate due to the imperfect directivity of the coupler and 2) mode-mismatch loss due to imperfect overlap between the coupler mode and the fiber mode. The latter may be mitigated by appropriate scattering element design. The substrate loss can be significantly reduced by employing a reflective surface embedded in the substrate. The reflector 305 may comprise such a reflecting surface, and may comprise a layer of metal deposited below the light coupler 307.

Figure 4:
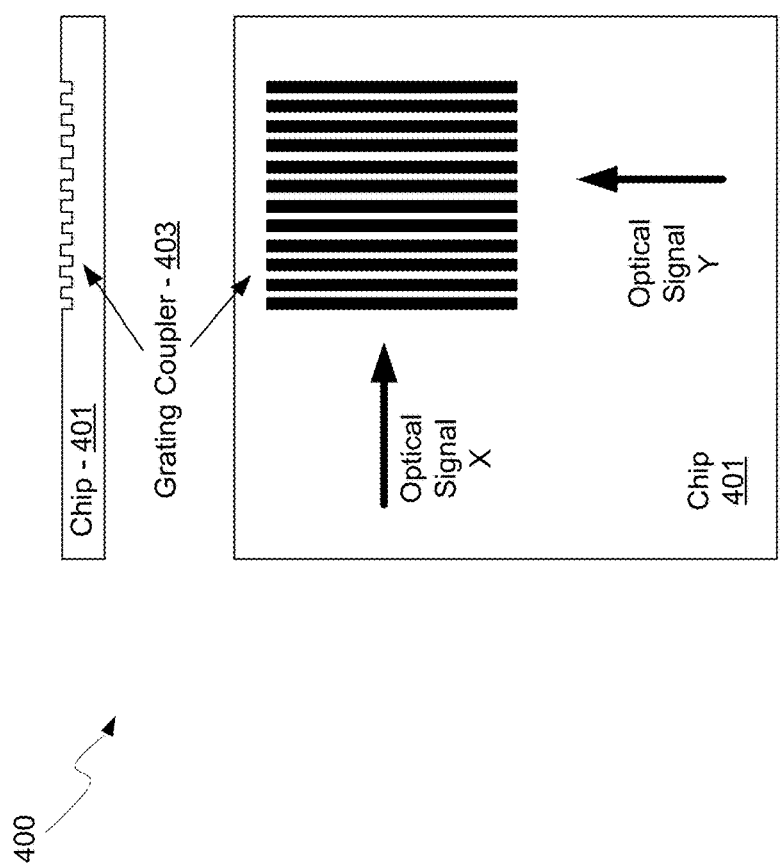
FIG. 4 is a diagram illustrating a chip comprising a one-dimensional grating, used in a single polarization grating coupler, in accordance with an exemplary embodiment of the invention.

FIG. 4 is a diagram illustrating a chip comprising a one-dimensional grating, as used in a single polarization grating coupler (SPGC), in accordance with an exemplary embodiment of the invention. For simplicity, the curvature of the grating and the waveguide taper are not shown.

Referring to FIG. 4, there is shown a chip 401 and a grating coupler 403. The chip 401 may comprise a silicon die, for example, on which electronic and photonic devices may be integrated, such as the grating coupler 403.

FIG. 4 shows a cross section and top view of a one-dimensional grating where the white area comprises silicon and the black bars comprise etched away areas. It should be noted that while FIG. 4 shows etched channels in silicon, the grating coupler 403 may instead comprise material deposited on a layer. The grating coupler 403 may comprise a single polarization grating coupler with a one-dimensional grating that scatters incident optical signals from one direction but not a perpendicular direction. For a guided wave perpendicular to the trenches, in the direction of the waveguide taper (not shown), optical signal X, the refractive index contrast causes strong scattering out of the waveguide. For a guided wave traveling parallel to the trenches, optical signal Y, the structure acts as an array of coupled waveguides and no scattering occurs, except weakly at the beginning and end of the trenches.

In an example scenario, perturbations may be incorporated in the grating coupler 403 by varying the shape, width, and/or spacing of the waveguides. Perturbed waveguides enable the scattering of guided waves with different and controllable strength, depending on the direction of incidence. This is illustrated further in FIG. 7A, for example.

Figure 5A:
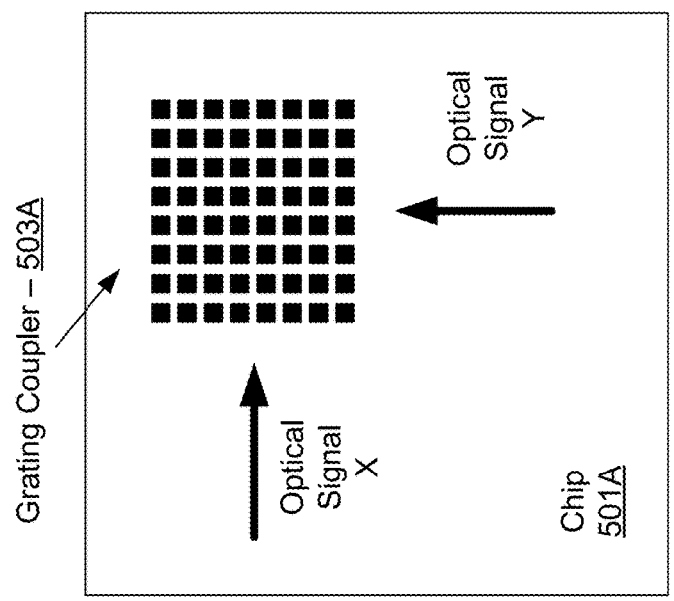
FIG. 5A is a diagram illustrating a two-dimensional grating, used in a polarization splitting grating coupler, in accordance with an exemplary embodiment of the invention.

FIG. 5A is a diagram illustrating a two-dimensional grating, used in a polarization splitting grating coupler, in accordance with an exemplary embodiment of the invention. For simplicity, the curvature of the grating and the waveguide tapers are not shown. Referring to FIG. 5A, there is shown a chip 501A comprising a grating coupler 503A. The chip 501A may comprise a silicon die, for example, on which electronic and photonic devices may be integrated, such as the grating coupler 503A, which in this example scenario comprises an array of square holes formed in a silicon layer at the top surface of the chip 501A. In this structure, guided waves, such as the optical signal X and the optical signal Y both experience similar scattering features and are thus scattered equally strongly, thereby illustrating a polarization splitting grating coupler (PSGC). The optical signals X and Y may be scattered out of the chip 501A, nearly perpendicular to the plane of the top surface of the chip 501.

Similarly, light incident on the top surface of the chip 501A on the grating coupler 503A may be scattered by the etched elements of the grating coupler 503A and result in guided optical modes directed out of the grating coupler 503A, in an opposite direction to that shown for optical signals X and Y. In other words, the grating coupler 503A may be utilized to transmit the optical signals X and Y out of the chip 501A and also to receive optical signals from external to the chip 501A.

It should be noted that the etched hole pattern is merely one example of scattering structures, as scattering structures may instead be deposited on top of the silicon layer. Furthermore, the aspect ratio of the etched feature may be different from one, resulting in rectangular features so that scattering is different for the optical signal X versus the optical signal Y. Similarly, the structures may be other shapes, as illustrated in FIG. 6C, for example.

Figure 5B:
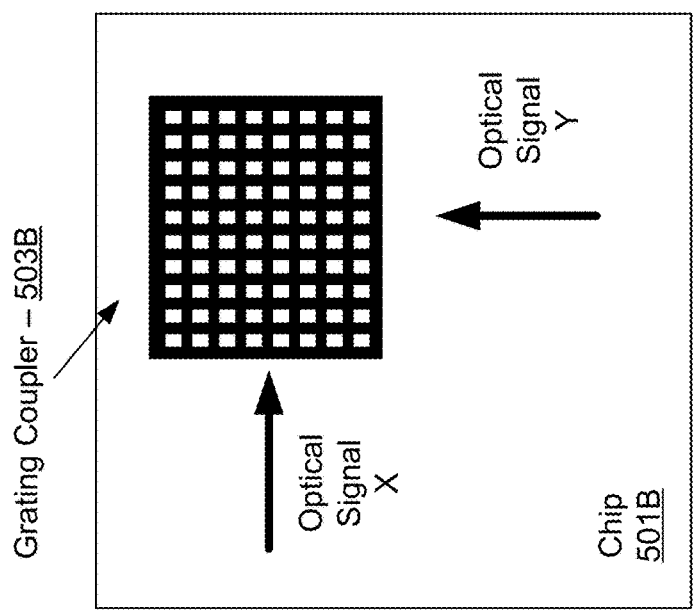
FIG. 5B shows an alternative pattern for a two-dimensional grating, used in a polarization splitting grating coupler, in accordance with an exemplary embodiment of the invention.

FIG. 5B shows an alternative pattern for a two-dimensional grating used in a polarization splitting grating coupler, in accordance with an exemplary embodiment of the invention. Referring to FIG. 5B, there is shown a chip 501B comprising a grating coupler 503B. Similar to the chip 501A, the chip 501B may comprise a silicon die, for example, on which electronic and photonic devices may be integrated, such as the grating coupler 503B, which in this example scenario comprises a grid of etched areas surrounding square or rectangular regions of silicon formed in a silicon layer at the top surface of the chip 501B. This is in contrast to the etched square or rectangular regions shown in FIG. 5A.

Figure 6A:
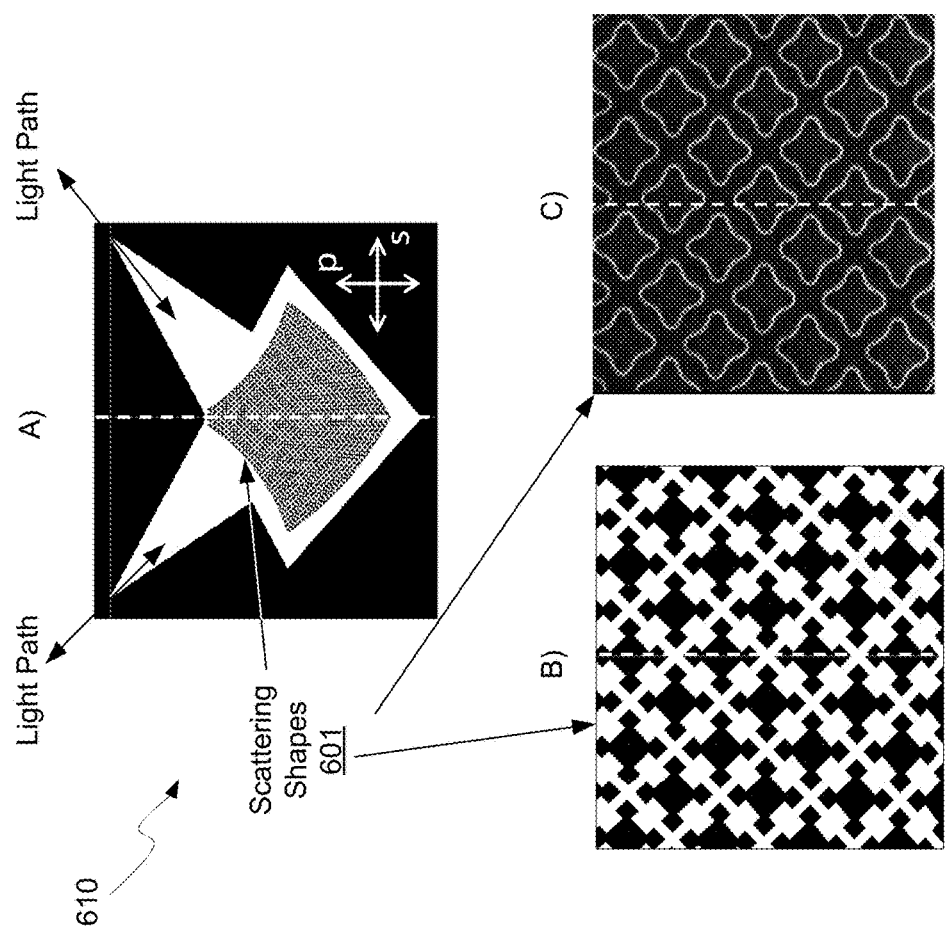
FIG. 6A illustrates an alternate shape for discrete scatterer polarization splitting grating couplers, in accordance with an exemplary embodiment of the invention.

FIG. 6A illustrates an alternate shape for discrete scatterer polarization splitting grating couplers, in accordance with an exemplary embodiment of the invention. Referring to FIG. 6A, there is shown three views of a polarization splitting grating coupler 610 comprising the scattering shapes 601. View A) shows the entire mask structure where the white region indicates where the mask material, which may comprise a metal such as chrome, for example, is placed to protect a silicon layer from being etched, and thus the black regions are etched away while the white areas are where silicon remains. This results in the light paths shown with the scattering pattern in the center of the polarization splitting grating coupler 610. The electric field for the S polarization lies in the plane of the figure, and for the P polarization it is generally out of the plane, depending on the angle of the fiber coupling the light to and from the polarization splitting grating coupler 610.

View B) is a close up view of the mask design for scattering shapes 601 in the polarization splitting grating coupler 610, where the scattering shapes 601 comprise an array of "square-like" patterns comprising small squares at each corner of a larger square, in contrast to the squares or rectangles of FIGS. 5A and 5B. In this and other embodiments, coupling to the fiber mode may be further optimized by gradually increasing the perturbation throughout the grating.

View C) shows a close up scanning electron microscope view (SEM) view of the structure resulting from etching the mask pattern shown in views A) and B), where the sharp corners of the mask pattern are rounded in the final structure.

Figure 6B:
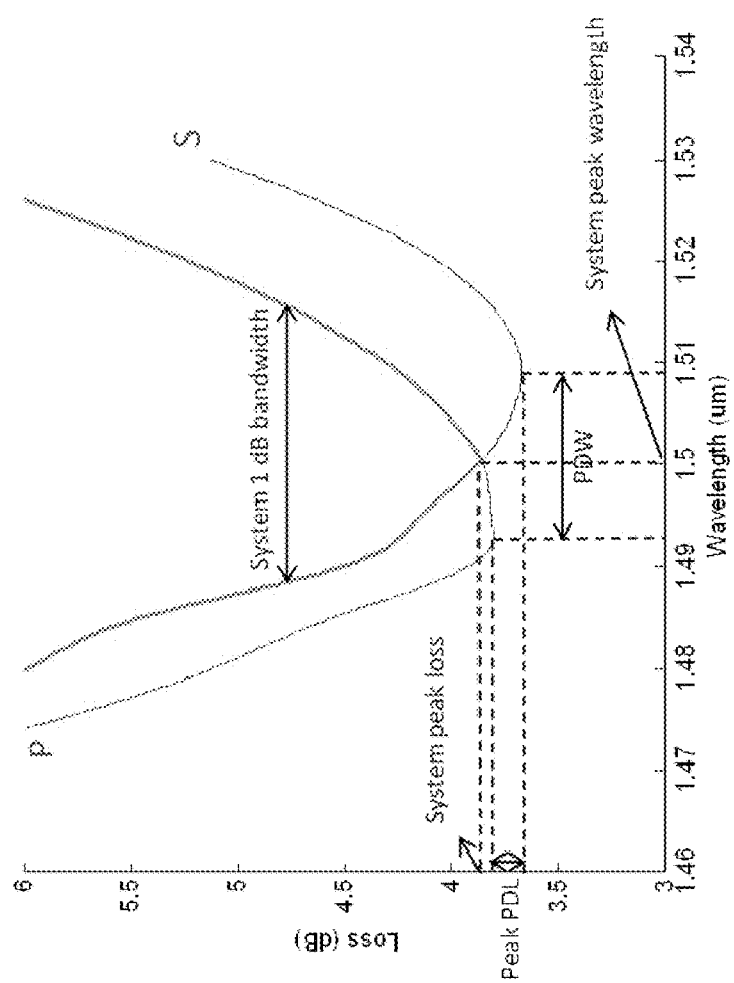
FIG. 6B illustrates performance parameters for polarization splitting grating couplers, in accordance with an exemplary embodiment of the invention.
Figure 6C:
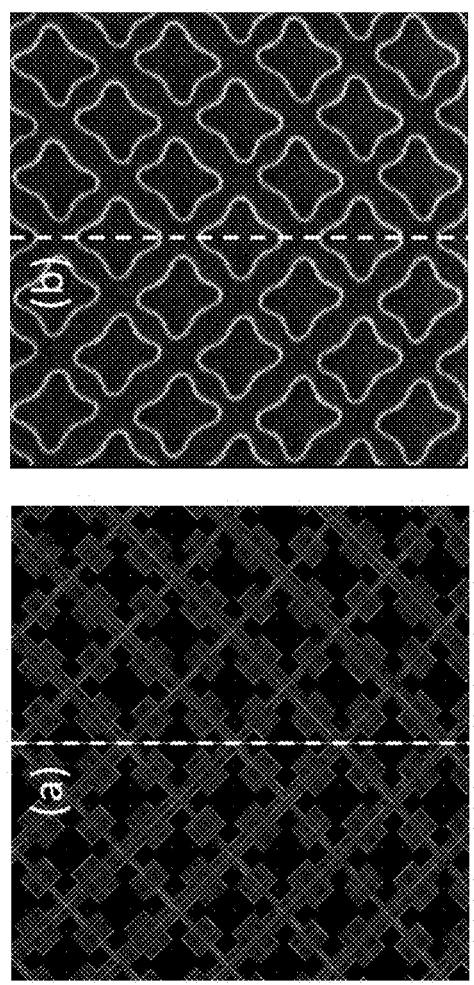
FIG. 6C illustrates another alternate shape for discrete scatterer polarization splitting grating couplers, in accordance with an exemplary embodiment of the invention.

FIG. 6B illustrates performance parameters for polarization splitting grating couplers, in accordance with an exemplary embodiment of the invention. Referring to FIG. 6B, there is shown a loss versus wavelength plot for the s- and p-polarizations that are shown in view A) of FIG. 6A. The performance parameters of a polarization splitting grating coupler comprise system peak wavelength, system peak loss, system 1 dB bandwidth, polarization dependent peak wavelength (PDW), and polarization dependent peak loss (PDL).

The S and P loss curves resulting from the shape of the holes in FIG. 6A, with the electric field directions shown for both polarizations in view A) of FIG. 6A, were configured to minimize polarization dependence, meaning that the S and P curves nearly overlap, so that polarization dependent wavelength and polarization dependent peak loss are minimized. The inner lines of the S and P curves, shown to define the System 1 dB bandwidth in the plot, indicate the worst case loss for both polarizations.

The system peak loss is defined as the lowest loss for the worst case loss curve, which for this simulated structure results in ~3.85 dB and the wavelength at which this occurs is the system peak wavelength, about 1.5 microns in this example. The polarization dependent peak wavelength is defined by the difference in wavelength between minima of the S and P curves, while the polarization dependent peak loss is defined by the difference in loss of the S and P curve minima.

FIG. 6C illustrates another alternate shape for discrete scatterer polarization splitting grating couplers, in accordance with an exemplary embodiment of the invention. Referring to FIG. 6C, there is shown view a) of a mask pattern for a polarization splitting grating coupler and view b) shows an SEM photo of the resulting etched pattern. As compared to the "square-like" shapes of FIG. 6A, the "rectangle-like" shapes shown in FIG. 6C may result in an improvement in the overlap with the fiber mode and a reduction in peak loss. This may be obtained by varying the shape of the holes throughout the grating, in that the aspect ratio of the rectangular holes can be large initially, at the onset of the grating, and can be reduced further into the grating. In both halves of the PSGC, the holes are stretched so that they become approximately rectangular. On the axis (indicated by the dashed line) of the PSGC, the holes remain "square-like". This causes the grating to scatter more weakly initially, and more strongly further in, and improves overlap with the fiber mode.

Figure 6D:
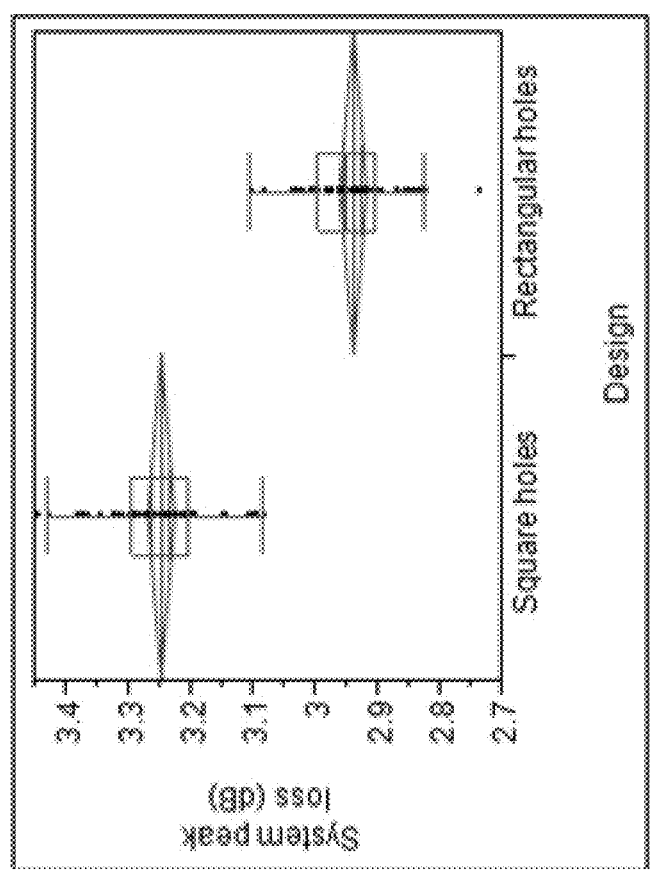
FIG. 6D illustrates system peak loss for approximately rectangular pattern polarization splitting grating couplers, in accordance with an exemplary embodiment of the invention.

FIG. 6D illustrates system peak loss for approximately rectangular pattern polarization splitting grating couplers, in accordance with an exemplary embodiment of the invention. Referring to FIG. 6D, there is shown the system peak loss, as defined in FIG. 6B, for the varying rectangular pattern shown in FIG. 6C as compared to the "square-like" pattern shown in FIG. 6A. As shown in the plot, the system peak loss is significantly less for the rectangular holes of FIG. 6C, with about 0.3 dB lower loss, without degrading other system performance parameters.

Figure 7A:
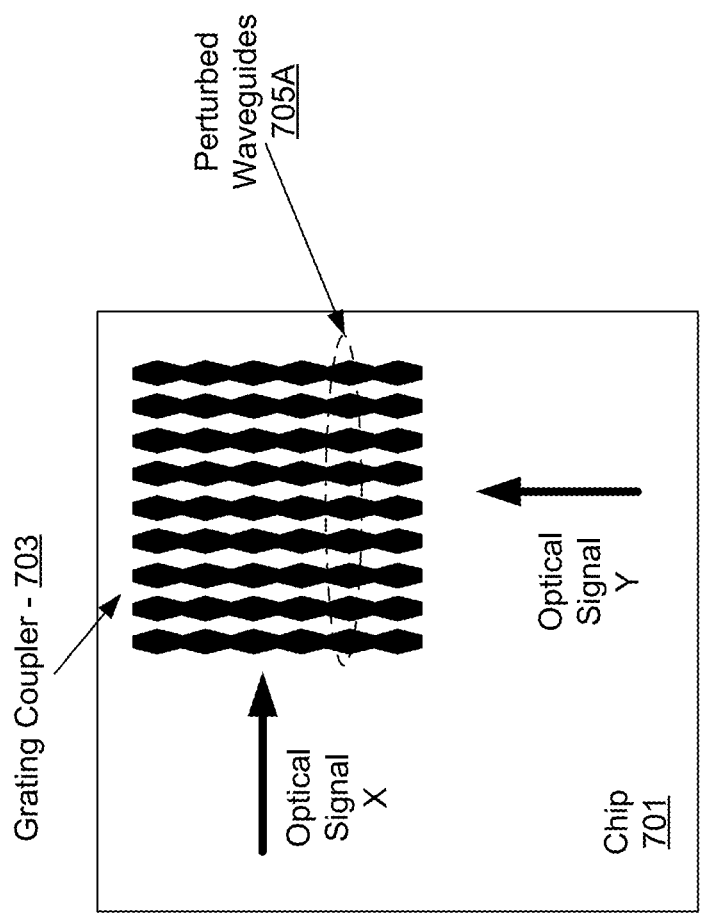
FIG. 7A is a schematic illustrating perturbed waveguides which may be used in a single polarization grating coupler and polarization splitting grating coupler, in accordance with an exemplary embodiment of the invention.

FIG. 7A is a schematic illustrating perturbed waveguides which may be used in a single polarization grating coupler and polarization splitting grating coupler, in accordance with an exemplary embodiment of the invention. Referring to FIG. 7A, there is shown a chip 701 comprising a grating coupler 703. The chip 701 may comprise a silicon die, for example, on which electronic and photonic devices may be integrated, such as the grating coupler 703, which in this example scenario comprises an array of perturbed waveguides 705A formed by trenches etched in a silicon layer on the top surface of the chip 701. The perturbed waveguides 705A in the grating coupler 703 may comprise varying widths over the length of the waveguides. This structure strongly scatters a guided wave incident perpendicular to the trenches, such as optical signal X, and weakly scatters light incident parallel to the waveguides, optical signal Y, throughout the structure. However, the perturbations in the waveguides do increase the scattering for optical signal Y as opposed to straight waveguides.

The invention is not limited to trenches etched into the top surface of the chip 701, as they may instead comprise structures deposited on the top surface of the chip 701, which may also provide optical mode scattering, depending on the shape and dielectric constant change between regions. The refractive index perturbation can also be introduced in a different nearby layer, such as poly-Si deposited on top of the waveguide or integrated underneath. The perturbed waveguides are not limited to the specific geometries described herein and include any combination of the described structures. Furthermore, the perturbations may increase in magnitude along the length of the perturbed waveguides.

Figure 7B:
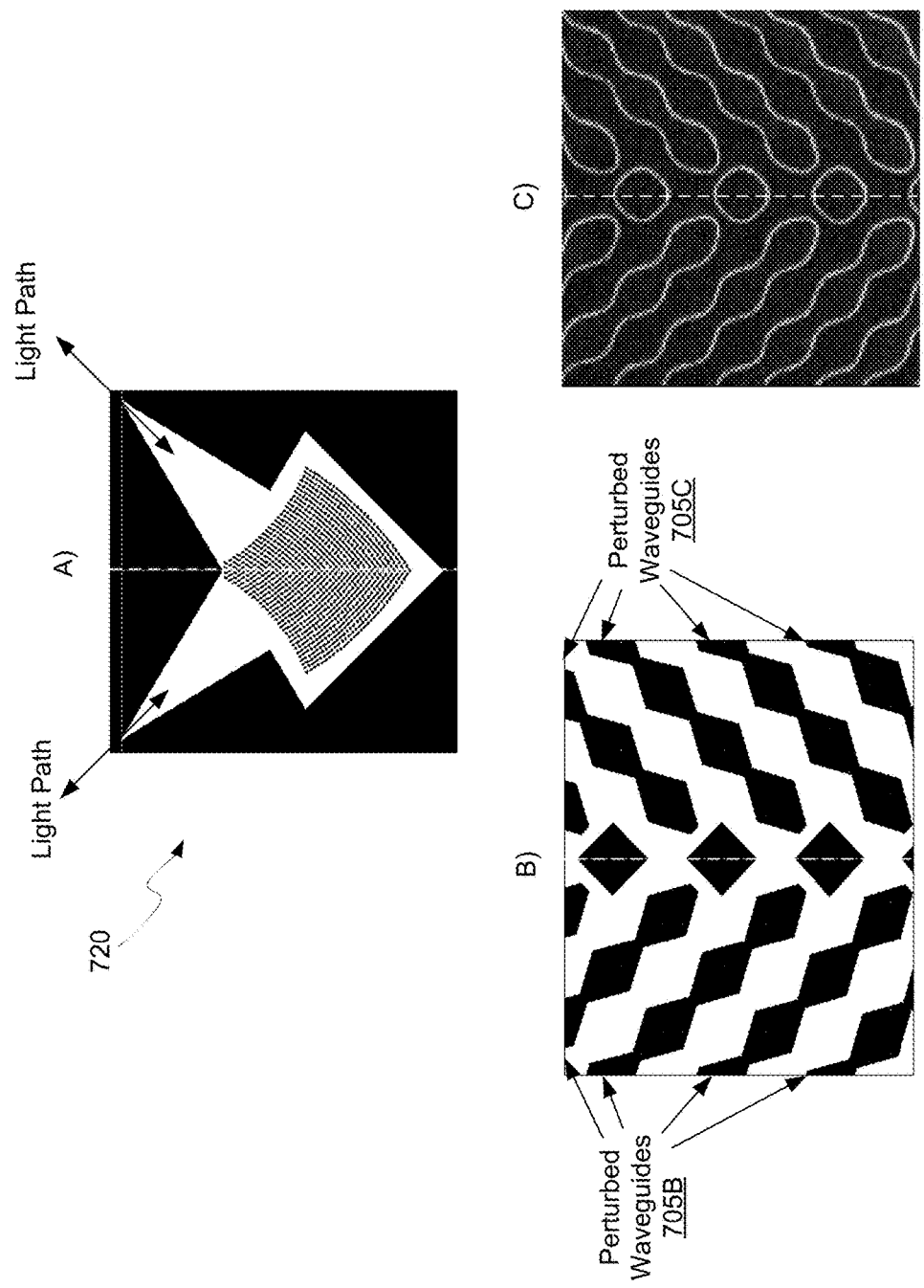
FIG. 7B illustrates a polarization splitting grating coupler utilizing perturbed waveguides, in accordance with an exemplary embodiment of the invention.

FIG. 7B illustrates a polarization splitting grating coupler utilizing perturbed waveguides, in accordance with an exemplary embodiment of the invention. Referring to FIG. 7B, there is shown three views of a polarization splitting grating coupler 720. View A) shows the entire mask structure where the white region indicates areas where the mask material, which may comprise a metal such as chrome, for example, is placed to protect a silicon layer from being etched, and thus the black regions are etched away while the white areas indicate where silicon remains. This results in perpendicular light paths that direct light to a scattering pattern in the center of the polarization splitting grating coupler 720.

View B) is a close up view of the mask design for the scattering structures in the polarization splitting grating coupler 720, where perturbed waveguides 705B and 705C comprise trenches of varying width, similar to the perturbed waveguides 705A shown in FIG. 7A, but utilizing a set of waveguides for each light path in the coupler that intersect at the center line, as indicated by the dashed line. The perturbed waveguides 705B and 705C may be substantially perpendicular at the intersection, but the invention is not so limited, except that the angle between them may be non-zero. The squares at the intersection of the two sets of perturbed waveguides 705B and 705C are merely an example. Other shapes may be utilized to connect the waveguides at the center axis.

In this embodiment, in each light path, the light is scattered weakly by the perturbations when first entering the grating coupler as they are nearly parallel to the light path but then scatters more strongly when it reaches the center as it is scattered by nearly perpendicular waveguides, as in a single polarization grating coupler where propagation is approximately perpendicular to the waveguides/trenches. Note that with this approach, coupling to the fiber mode may be further optimized by gradually increasing the perturbation throughout the grating.

The strong scattering near the intersections of the perturbed waveguides 705B and 705C creates a better modal overlap with the fiber mode, and thus, reduces modal loss. Bandwidth may also be improved as compared to conventional designs based on individual scatterers. In addition, perturbed waveguide designs may also improve the manufacturability of the grating couplers, by increasing the minimum feature size and by using large continuous features.

View C) shows a scanning electron microscope view (SEM) view of the structure resulting from etching the mask pattern shown in views A) and B), where the sharp corners of the mask pattern are rounded in the final structure.

Figure 7C:
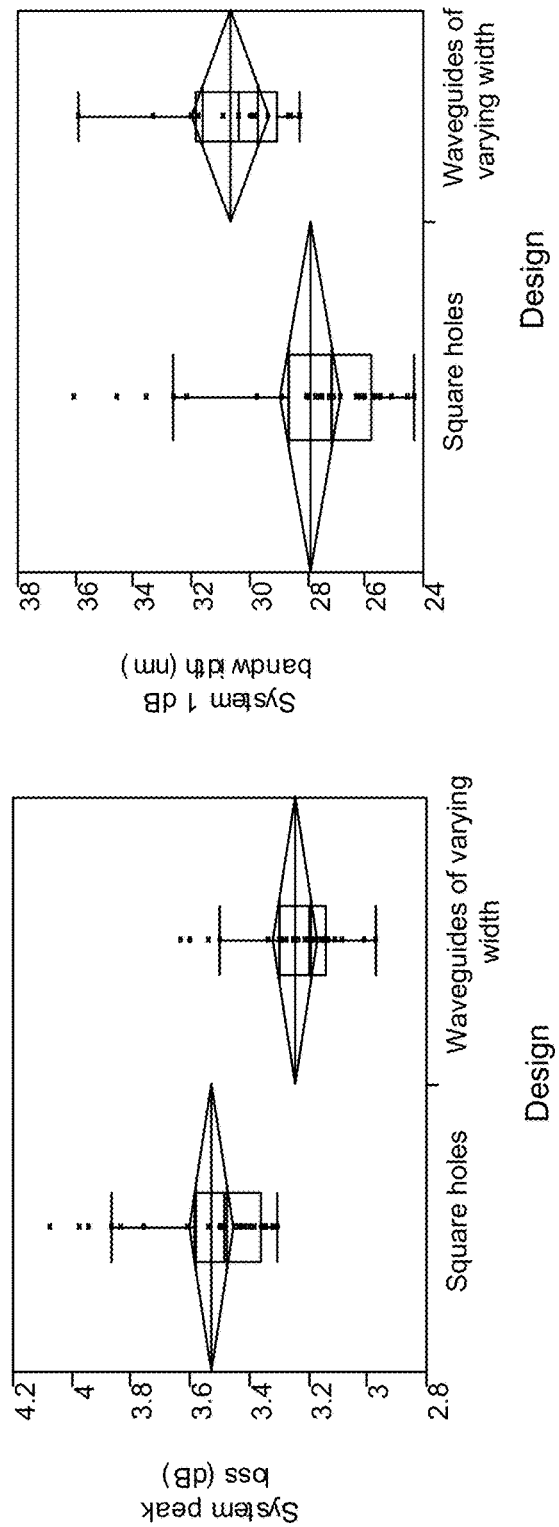
FIG. 7C illustrates optical measurement results for perturbed waveguide polarization splitting grating couplers, in accordance with an exemplary embodiment of the invention.

FIG. 7C illustrates optical measurement results for perturbed waveguide polarization splitting grating couplers, in accordance with an exemplary embodiment of the invention. Referring to FIG. 7C, there is shown a plot of system peak loss and system 1 dB bandwidth for two designs, one being a square hole grating coupler and the other being a varying width grating coupler. System peak loss is defined as the lowest loss for the worst case loss curve, as illustrated in FIG. 6B.

Figure 8:
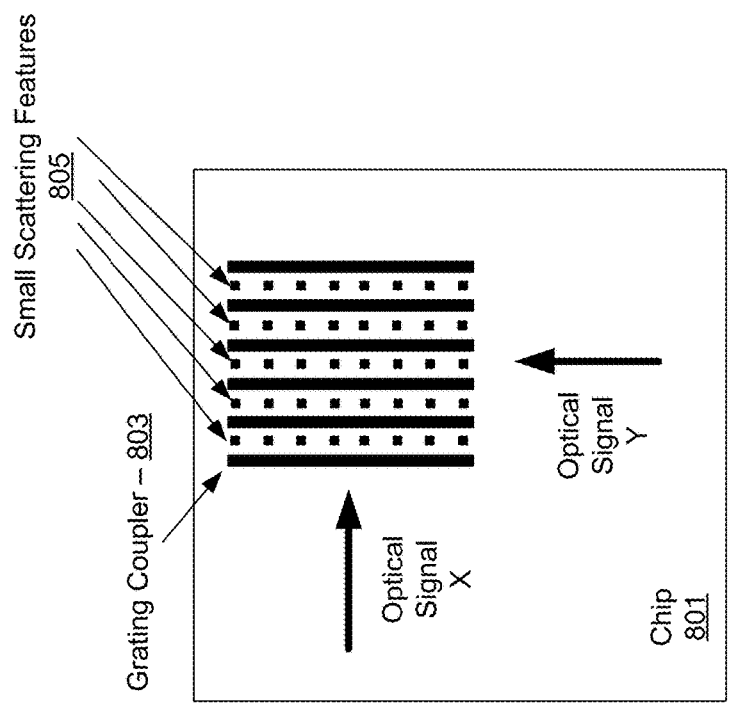
FIG. 8 is a schematic illustrating perturbed waveguides comprising small scattering features which may be used in a single polarization grating coupler and polarization splitting grating coupler, in accordance with an exemplary embodiment of the invention.

FIG. 8 is a schematic illustrating perturbed waveguides comprising small scattering features which may be used in a single polarization grating coupler and polarization splitting grating coupler, in accordance with an exemplary embodiment of the invention. Referring to FIG. 8, there is shown a chip 801 comprising a grating coupler 803 with straight waveguides plus small scattering features 805, which in this exemplary scenario comprise small squares that may be etched into the silicon layer. Alternatively, the small scattering features 805 may comprise features deposited on top of the silicon layer.

The small scattering features 805 increase the scattering of optical signal Y as compared to a straight waveguide grating coupler, as well as increase the scattering of optical signal X. These scattering features provide another level of flexibility in grating coupler design, in that discrete scattering features may also provide perturbations, in addition to perturbations in the waveguides themselves.

Figure 9A:
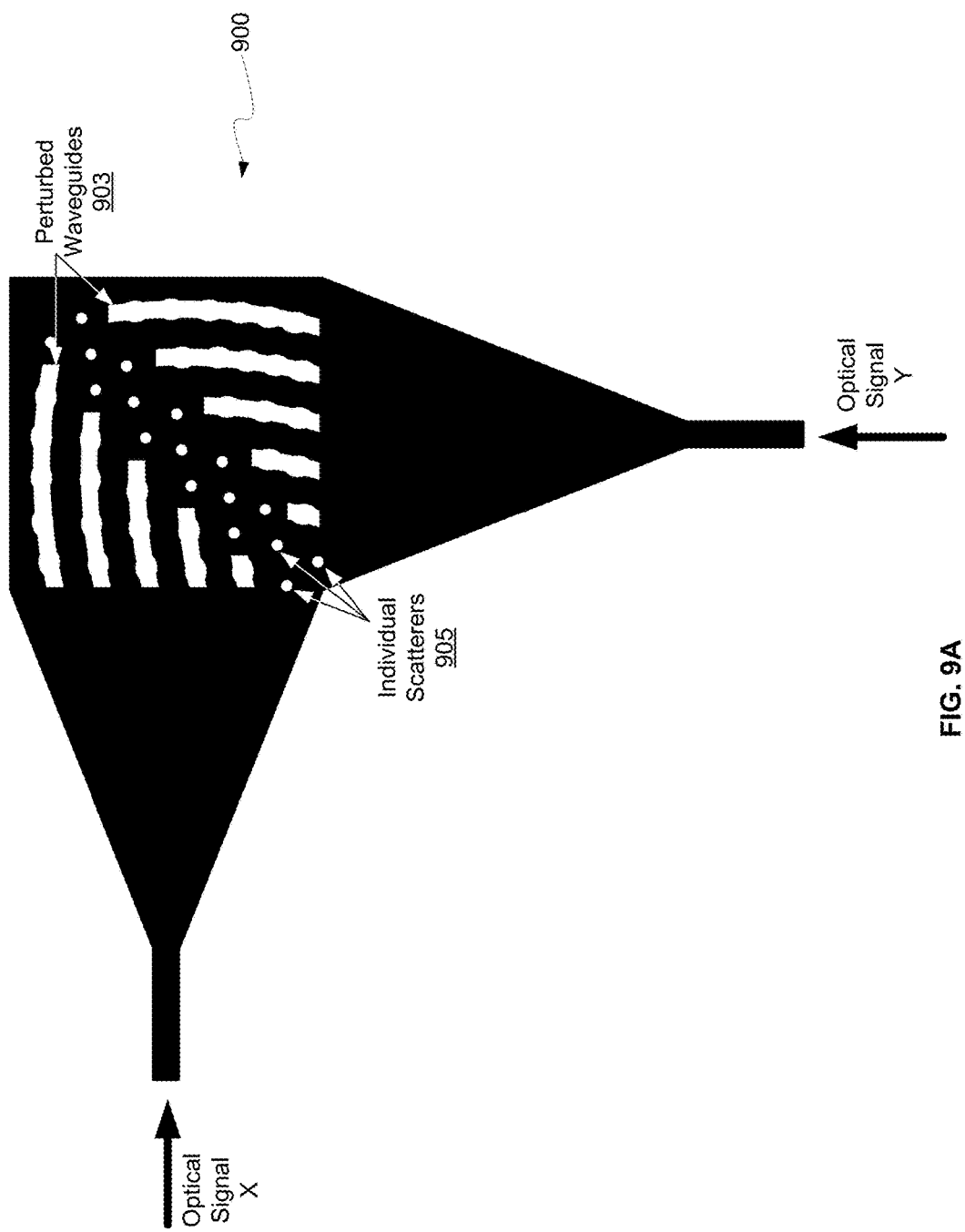
FIG. 9A illustrates a polarization splitting grating coupler with perturbed waveguides as well as individual scatterers, in accordance with an exemplary embodiment of the invention.

FIG. 9A illustrates a polarization splitting grating coupler with perturbed waveguides as well as individual scatterers, in accordance with an exemplary embodiment of the invention. Referring to FIG. 9, there is shown a polarization splitting grating coupler 900 comprising perturbed waveguides 903 and individual scatterers 905.

The perturbed waveguide geometry can be varied with position to further optimize the modal overlap with the fiber. The perturbed waveguide may be incorporated with a polarization splitting grating coupler that uses individual scatterers at the intersection of the curved lines This embodiment comprises a combination of perturbed waveguides 903 of varying widths and individual scatters 905 at the intersection of the waveguides, which may reduce the system peak loss.

FIG. 9B is an image of a mask design with individual scatterers at the intersection of perturbed waveguides in a polarization splitting grating coupler, in accordance with an exemplary embodiment of the invention. Referring to FIG. 9B, there is shown a close up view of the intersection of the perturbed waveguides 903 showing the individual scatterers 905.

The shape of the individual scatterers 905 may vary along the line intersecting the perturbed waveguides 903. This may improve mode matching between grating coupler and fiber modes.

Figure 10A:
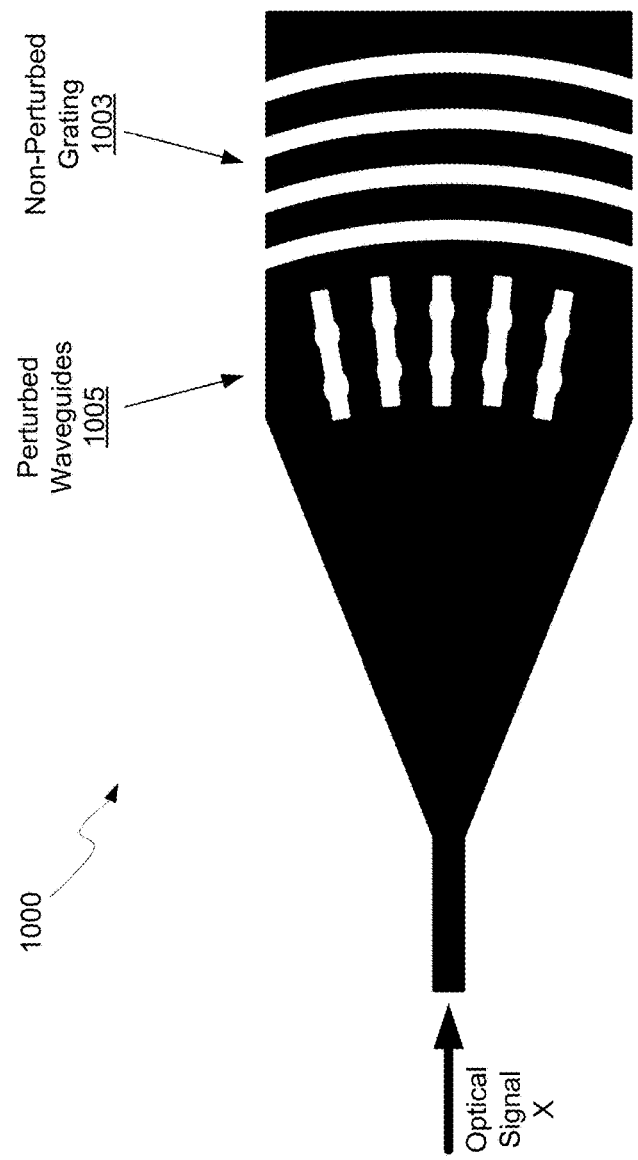
FIG. 10A illustrates a single polarization grating coupler, in accordance with an exemplary embodiment of the invention.

FIG. 10A illustrates a single polarization grating coupler, in accordance with an exemplary embodiment of the invention. Referring to FIG. 10A, there is shown a single polarization grating coupler 1000 comprising a non-perturbed grating 1003 and perturbed waveguides 1005.

The lithographic limit prevents arbitrarily narrow trenches from being used in grating design. In a single polarization grating coupler comprising waveguides/trenches in one orientation, as illustrated in FIG. 4 (curvature and waveguide taper not shown), the first trenches typically scatter more strongly than desired, resulting in an imperfect modal overlap between the grating coupler and the fiber mode. Perturbed waveguides may be utilized to weakly scatter the optical signal at the beginning of the grating, allowing the grating coupler to approximate the fiber mode more closely.

Figure 10B:
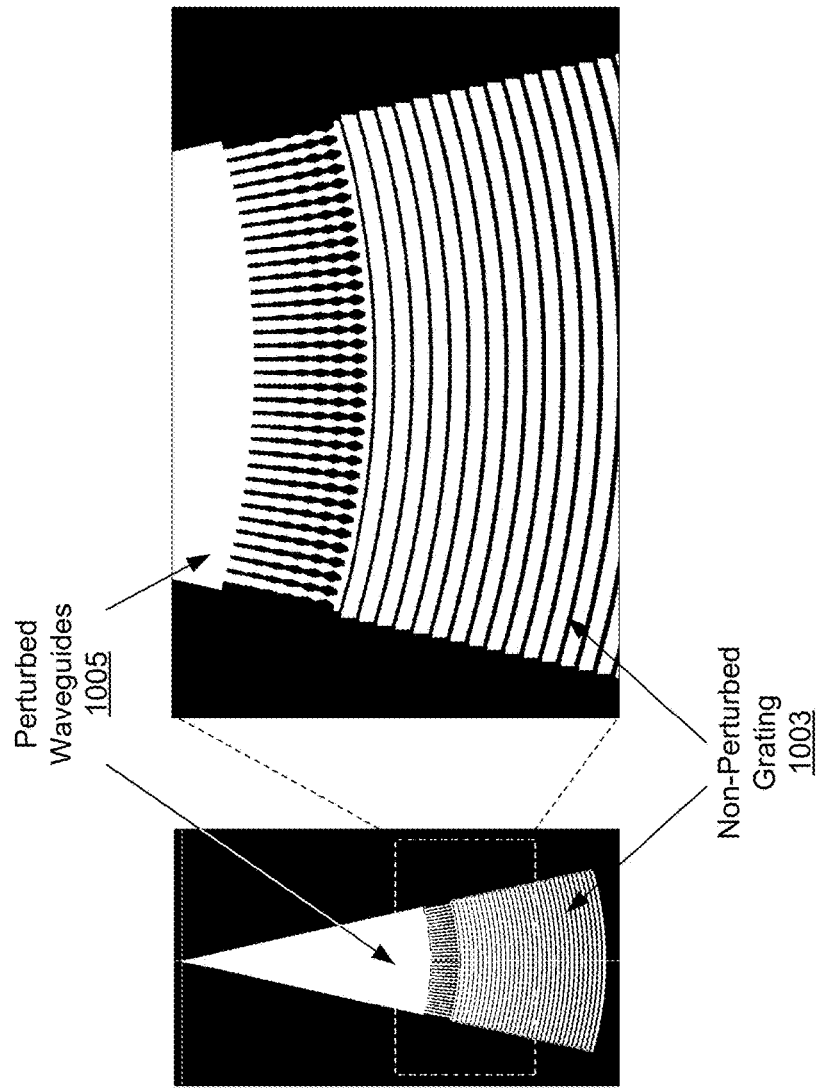
FIG. 10B illustrates a mask design for a single polarization grating coupler, in accordance with an exemplary embodiment of the invention.

FIG. 10B illustrates a mask design for a single polarization grating coupler, in accordance with an exemplary embodiment of the invention. Referring to FIG. 10B, there is shown a mask pattern comprising non-perturbed grating 1003 and perturbed waveguides. As described above for FIG. 10A, the perturbed waveguides 1005 provide weak scattering at the beginning of the coupler as opposed to a simple non-perturbed grating coupler, which has too strong scattering at the incident edge of the grating, causing poor optical mode mismatch. By configuring the perturbed waveguides 1005 with varying perturbation along the length of the waveguides, the scattering mode may be varied to a desired position for best match to the fiber mode.

Figure 11:
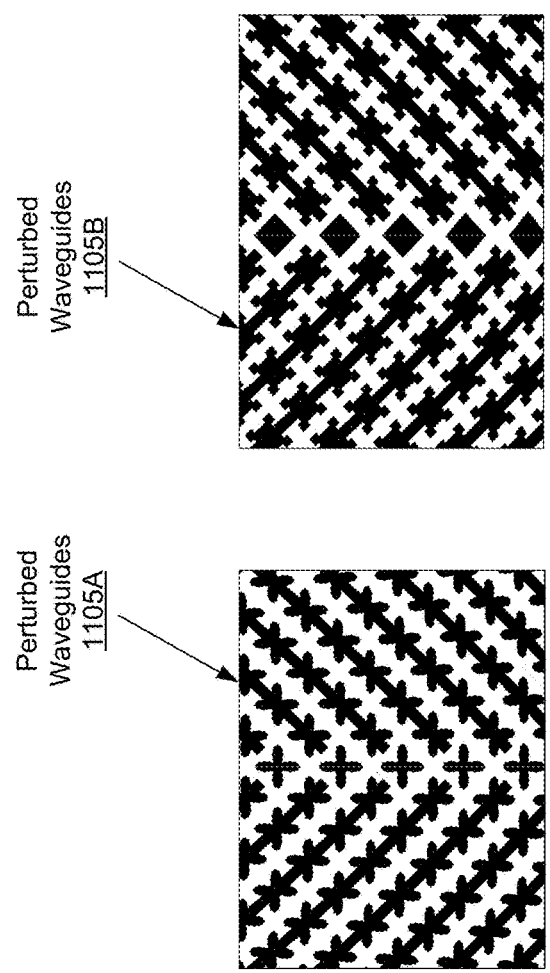
FIG. 11 illustrates alternative perturbation shapes in a polarization splitting grating coupler, in accordance with an exemplary embodiment of the invention.

FIG. 11 illustrates alternative perturbation shapes in a polarization splitting grating coupler, in accordance with an exemplary embodiment of the invention. Referring to FIG. 11, there is shown perturbed waveguides 1105A and 1105B. Electromagnetic simulations were utilized to configure these perturbation shapes to reduce polarization dependence.

Figure 12:
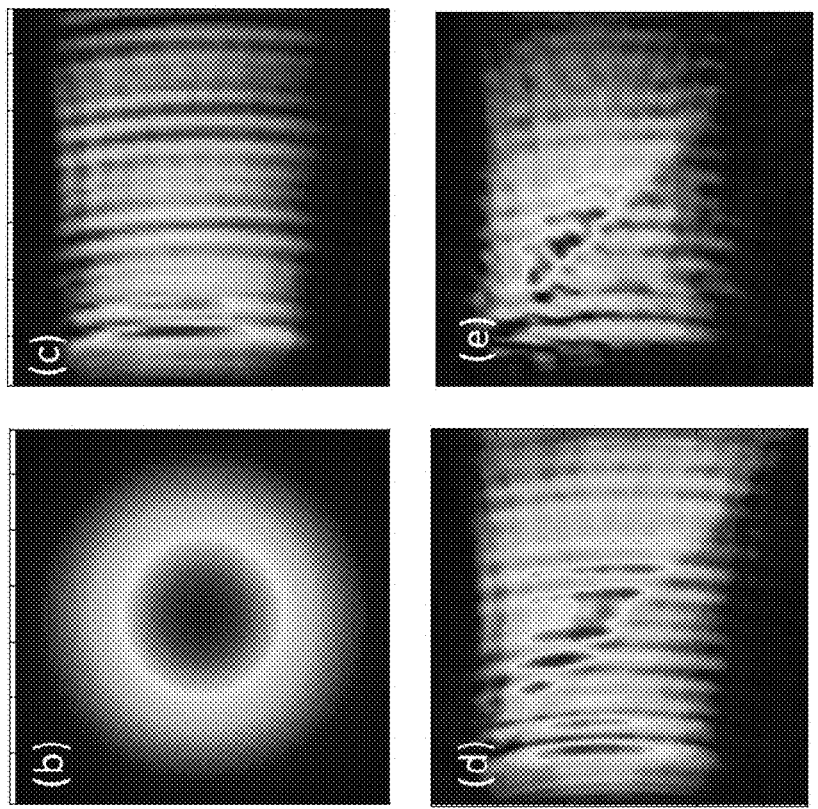
FIG. 12 illustrates a polarization splitting grating coupler and electromagnetic mode simulations, in accordance with example embodiments of the invention.
Figure 12:
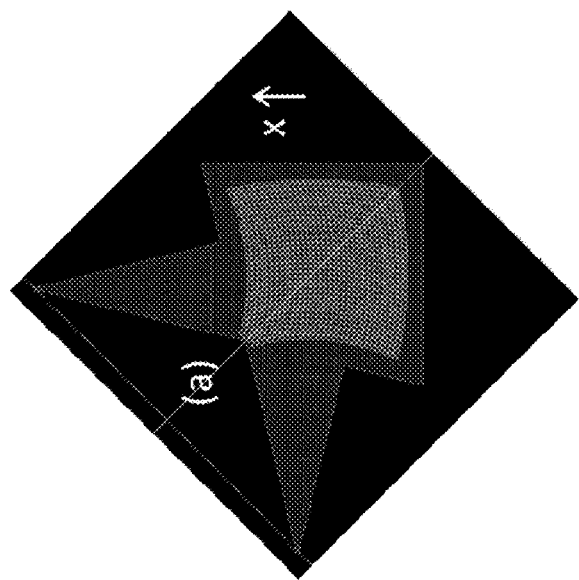

FIG. 12 illustrates a polarization splitting grating coupler and electromagnetic mode simulations, in accordance with example embodiments of the invention. Referring to FIG. 12, there is shown a polarization splitting grating coupler in view a). The improvements demonstrated with the new grating structures can be best understood by considering the scattering patterns, obtained from electromagnetic simulations. The electric field intensity $|E_x|^2$ is shown in views (b)-(e). The goal of the grating design is to approximate the fiber mode, shown in view (b), as closely as possible, to achieve low system peak loss and high bandwidth. For a design with approximately square holes, the grating scatters very strongly at the onset, shown in view (c), thereby reducing the overlap with the fiber mode. The polarization splitting grating coupler design with rectangular holes reduces the initial scattering somewhat, and creates stronger scattering near the symmetry axis, as shown in view (d). Scattering at the onset of the grating is further reduced for the design with waveguides of varying widths, as shown in view (e).

In an exemplary embodiment of the invention, a method and system are disclosed for grating couplers incorporating perturbed waveguides. In this regard, aspects of the invention may comprise a semiconductor photonics die or chip 130, 401, 501A, 501B that is operable to communicate optical signals into and/or out of the semiconductor die 130, 401, 501A, 501B utilizing a grating coupler 117A-117H, 307, 403, 503A, 503B, 610, 703, 720, 803, 900, 1000, on the semiconductor photonics die 130, 401, 501A, 501B, where the grating coupler 117A-117H, 307, 403, 503A, 503B, 610, 703, 720, 803, 900, 1000 comprises perturbed waveguides 705A-705C, 903, 1005, 1105A, 1105B. The perturbed waveguides may comprise a variable width along a length of the perturbed waveguides 705A-705C, 903, 1005, 1105A, 1105B.

The grating coupler 117A-117H, 307, 403, 503A, 503B, 610, 703, 720, 803, 900, 1000 may comprise a single polarization grating coupler 1000 comprising perturbed waveguides 1005 and a non-perturbed grating 1003. The grating coupler may comprise a polarization splitting grating coupler 503A, 610, 720, 900, that includes two sets of perturbed waveguides 705A-705C, 903, 1005, 1105A, 1105B at a non-zero angle from each other. The polarization splitting grating coupler 900 may comprise individual scatterers 905 at an intersection of the sets of perturbed waveguides. The polarization splitting grating coupler may comprise a plurality of non-linear rows of individual scattering shapes 601. The grating couplers 117A-117H, 307, 403, 503A, 503B, 610, 703, 720, 803, 900, 1000 may be etched in a silicon layer on the semiconductor photonics die 130, 401, 501A, 501B or deposited on the semiconductor photonics die. The grating coupler 900 may comprise individual scatterers 905 between the perturbed waveguides 903.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communication, the method comprising:
in a semiconductor photonics die:
communicating optical signals into and/or out of said semiconductor photonics die utilizing a grating coupler on said semiconductor photonics die, wherein said grating coupler comprises perturbed waveguides as scattering elements, wherein the perturbed waveguides comprise rows of repeating spatially overlapping scatterers along each waveguide.

2. The method according to claim 1, wherein said perturbed waveguides comprise a variable width along a length of the perturbed waveguides.

3. The method according to claim 1, wherein said grating coupler comprises a single polarization grating coupler comprising perturbed waveguides and a non-perturbed grating.

4. The method according to claim 1, wherein said grating coupler comprises a polarization splitting grating coupler.

5. The method according to claim 4, wherein said polarization splitting grating coupler comprises two sets of rows of perturbed waveguides that are at a non-zero angle from each other.

6. The method according to claim 5, wherein said polarization splitting grating coupler comprises scatterers at intersections of said two sets of rows of perturbed waveguides.

7. The method according to claim 5, wherein said polarization splitting grating coupler comprises a plurality of non-linear rows of discrete shapes at intersections of said two sets of rows of perturbed waveguides.

8. The method according to claim 1, wherein said grating coupler is etched in a silicon layer on said semiconductor photonics die.

9. The method according to claim 1, wherein said grating coupler is deposited on said semiconductor photonics die.

10. The method according to claim 1, wherein said grating coupler comprises individual scatterers between said perturbed waveguides.

11. A system for communication, the system comprising:
a semiconductor photonics die comprising:
a grating coupler on said semiconductor photonics die, said grating coupler comprising perturbed waveguides as scattering elements and being operable to communicate optical signals into and/or out of said semiconductor die, wherein the perturbed waveguides comprise rows of repeating spatially overlapping scatterers along each waveguide.

12. The system according to claim 11, wherein said perturbed waveguides comprise a variable width along a length of the perturbed waveguides.

13. The system according to claim 11, wherein said grating coupler comprises a single polarization grating coupler comprising perturbed waveguides and a non-perturbed grating.

14. The system according to claim 11, wherein said grating coupler comprises a polarization splitting grating coupler.

15. The system according to claim 14, wherein said polarization splitting grating coupler comprises two sets of rows of perturbed waveguides that are at a non-zero angle from each other.

16. The system according to claim 15, wherein said polarization splitting grating coupler comprises scatterers at intersections of said two sets of rows of perturbed waveguides.

17. The system according to claim 15, wherein said polarization splitting grating coupler comprises a plurality of non-linear rows of shapes at intersections of said two sets of rows of perturbed waveguides.

18. The system according to claim 11, wherein said grating coupler is etched in a silicon layer on said semiconductor photonics die.

19. The system according to claim 11, wherein said grating coupler comprises individual scatterers between said perturbed waveguides.

20. A system for communication, the system comprising:
a semiconductor photonics die comprising:
a polarization splitting grating coupler on said semiconductor photonics die, said grating coupler comprising perturbed waveguides and discrete scatterers as scattering elements and being operable to communicate optical signals into and/or out of said semiconductor die, wherein the perturbed waveguides comprise rows of repeating spatially overlapping scatterers along each waveguide.

* * * * *